United States Patent
Zhou et al.

(10) Patent No.: US 9,604,630 B2
(45) Date of Patent: Mar. 28, 2017

(54) HYBRID AUTOMOBILE AND POWER SYSTEM TORQUE CONTROL METHOD THEREOF

(71) Applicant: SAIC Motor Corporation Limited, Shanghai (CN)

(72) Inventors: Yuxing Zhou, Shanghai (CN); Pengjun Zhang, Shanghai (CN); Jun Zhu, Shanghai (CN); Xiaoguang Deng, Shanghai (CN); Jun Sun, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 0 days.

(21) Appl. No.: 14/772,515

(22) PCT Filed: Feb. 28, 2014

(86) PCT No.: PCT/CN2014/072693
§ 371 (c)(1),
(2) Date: Sep. 3, 2015

(87) PCT Pub. No.: WO2014/135030
PCT Pub. Date: Sep. 12, 2014

(65) Prior Publication Data
US 2016/0009269 A1  Jan. 14, 2016

(30) Foreign Application Priority Data
Mar. 4, 2013  (CN) .......................... 2013 1 0067504

(51) Int. Cl.
*B60W 20/00* (2016.01)
*B60K 6/442* (2007.10)
(Continued)

(52) U.S. Cl.
CPC ............. *B60W 20/10* (2013.01); *B60K 6/442* (2013.01); *B60L 15/20* (2013.01); *B60W 10/06* (2013.01);
(Continued)

(58) Field of Classification Search
CPC ...... B60W 10/06; B60W 20/00; B60W 20/10; B60W 30/188; B60W 10/08;
(Continued)

(56) References Cited

U.S. PATENT DOCUMENTS

2008/0305923 A1* 12/2008 Tabata ..................... B60K 6/40
477/3
2012/0089287 A1* 4/2012 Nishiyama .............. B66C 13/12
701/22

FOREIGN PATENT DOCUMENTS

CN  101062683 A  10/2007
CN  101066674 A  11/2007
(Continued)

OTHER PUBLICATIONS

State Intellectual Property Office of the P.R. China, International Search Report for International Application No. PCT/CN2014/072693, mailing date Jun. 10, 2014, 6 pages.
(Continued)

*Primary Examiner* — Marthe Marc-Coleman
(74) *Attorney, Agent, or Firm* — McDonnell Boehnen Hulbert & Berghoff LLP

(57) ABSTRACT

A hybrid system torque control method and hybrid automobile using same, the method comprising the following steps: (1) analyzing the torque required by a driver; (2) allocating and coordinating the multiple-source torque. The method ensures a consistent driving feel within the range of real-time power source torque capacity, and facilitates hybrid system matching.

13 Claims, 2 Drawing Sheets

(51) Int. Cl.
  *B60W 10/06* (2006.01)
  *B60W 10/08* (2006.01)
  *B60W 30/188* (2012.01)
  *B60W 20/10* (2016.01)
  *B60L 15/20* (2006.01)

(52) U.S. Cl.
  CPC ............ *B60W 10/08* (2013.01); *B60W 20/00* (2013.01); *B60W 30/188* (2013.01); *B60L 2240/423* (2013.01); *B60L 2240/443* (2013.01); *B60W 2510/242* (2013.01); *B60W 2520/10* (2013.01); *B60W 2540/10* (2013.01); *B60W 2710/0666* (2013.01); *B60W 2710/083* (2013.01); *Y02T 10/645* (2013.01); *Y02T 10/72* (2013.01); *Y02T 10/7275* (2013.01); *Y10S 903/903* (2013.01)

(58) Field of Classification Search
  CPC ..... B60W 2710/0666; B60W 2540/10; B60W 2520/242; B60W 1710/083; B60L 15/20; B60L 2240/423; B60L 2240/443; B60K 6/442; Y02T 10/72; Y02T 10/7275; Y02T 10/635; Y10S 903/903
  USPC ............ 701/22; 180/65.23, 65.265; 903/903
  See application file for complete search history.

(56) References Cited

FOREIGN PATENT DOCUMENTS

| CN | 101244721 A | | 8/2008 |
| CN | 101982360 | * | 3/2011 |
| CN | 101982360 A | | 3/2011 |
| CN | 102582624 A | * | 7/2012 |
| CN | 102582624 A | | 7/2012 |
| JP | 2010-200568 | | 9/2010 |
| JP | 2011-51383 A | | 3/2011 |

OTHER PUBLICATIONS

Zhou Lei; et al., Development of Hybrid Powertrain Control System for Parallel-Series Hybrid Electric Vehicle, Chinese Journal of Mechanical Engineering, Apr. 2007, vol. 43, No. 4, China Academic Journal Electronic Publishing House, 7 pages. (English Abstract).

* cited by examiner

HYBRID AUTOMOBILE AND POWER SYSTEM TORQUE CONTROL METHOD THEREOF

TECHNICAL FIELD

The disclosure relates to the new energy vehicle power control design field and, in particular, relates to a hybrid power-train torque control method and a hybrid vehicle to which the method is applied.

BACKGROUND ART

Hybrid vehicles are largely different from conventional vehicles in their power-trains, the hybrid power-train featuring in multi-power sources, complex operation modes, and substantial engine-motor response characteristic distinction. Appropriately distributing power between the multi-power sources, i.e., how to couple and output torques of power source components, has a substantial effect on smooth performance and reliability of operation of the power-train.

SUMMARY

An object intended to be achieved in the disclosure is to provide a hybrid power-train torque control method for ensuring smoothness of output of the power-train and better response of the power-train and for optimizing drive ability of a hybrid vehicle.

The object is achieved by the following technical solution.

A hybrid power-train torque control method, power source components of the power-train including an engine and a motor, comprising steps of:
(1) interpreting driver's torque requirement, including:
 (1a) calculating a maximum torque achievable from the power-train;
 (1b) calculating a power-train load rate according to driver's instruction; and
 (1c) calculating the torque requirement based on the maximum torque and the power-train load rate; and
(2) torque distributing and coordinating between the power sources, including:
 (2a) distributing the torque requirement between the power sources, to obtain at least an engine pre-distributed torque for the engine and a motor pre-distributed torque for the motor; and
 (2b) acquiring an output torque of the engine in real time, calculating the difference between the output torque and the engine pre-distributed torque, and compensating the difference with the motor.

Two parts are included in the hybrid power-train torque control method to which the disclosure relates: 1. driver's torque requirement interpretation; and 2. torque distribution and coordination between the power sources. For the hybrid-powered electric vehicle, operation modes of its power-train should include at least one or two or even more power source torque coupling modes, including but not limited to, a parallel mode, a parallel mode, a pure electric drive mode, a serial mode, and any combination thereof, which are common for hybrid power-trains.

The driver's torque requirement interpretation includes several aspects as follows: 1. calculating a maximum torque ability of the hybrid power-train; 2. calculating a power-train load rate desired by the driver; 3. torque distributing and coordinating; and 4. torque requirement filtering. The maximum torque ability of the hybrid power-train is the maximum driving torque achievable in all operation modes in a current state of the power-train (the state of components, such as traction batteries, motors, and engine etc.), without limited by the current operation mode. The power-train load rate desired by the driver denotes a proportion of the power performance required by the driver to the total ability of the power-train, wherein the total ability of the power-train not only can refer to the optimal performance achievable by the system in the most optimized state, but also can refer to the maximum ability achievable from the power-train in the current state. As for the torque distributing and coordinating, driver's initial torque requirement is obtained based on the maximum torque ability of the hybrid power-train and the driver's desired load rate. The driver's initial torque requirement is arbitrated with other torque requirements (which may include, but not limited to, constant speed cruise torque requirement etc.) to obtain a first intermediate torque, and the first intermediate torque is limited depending on the operation mode of the hybrid power-train and arbitrated to obtain a second intermediate torque. The torque requirement filtering means limiting a change rate of the second intermediate torque obtained in the previous step with a filter, making it to follow the desired power performance for the driver while not causing shaking and vibrating of the power-train or the whole vehicle due to the rapidly change of the torque. The driver's torque requirement is finally obtained.

During the driver's torque requirement interpretation, an accelerator pedal Map profile, but not limited to the accelerator pedal Map profile, can be used in the driver's desired power-train load rate calculation. An input of the accelerator pedal Map profile may be accelerator pedal opening (depressed degree) and signals characterizing the power-train or the whole vehicle speed, including a vehicle speed, a rotating speed of an output shaft of a driving system, and a rotating speed of an input shaft of the driving system. The Map profile is embodied as a discrete storage manner of calibrated data, typically in the form of a one-dimensional or two-dimensional table. For the one-dimensional table, a variable is input as an input value for table look-up, and the difference value between two break points on the input shaft which are most closest is calculated out as an output value; and for the two-dimensional table, two variables are input as input values for table look-up, and the difference value between two break points on the input shaft which are most closest is calculated out as an output value.

The torque distributing and coordinating in the driver's torque requirement interpretation can be carried out by three, but not limited to three, methods, including: (1) multiplying the real-time maximum torque ability of the hybrid power-train by the driver's desired load rate to obtain the initial torque requirement; (2) multiplying the torque ability of the hybrid power-train in an optimal state by the driver's desired load rate to obtain the initial torque requirement; and (3) multiplying load rate requirement outputted in a basic part of the accelerator pedal Map profile by a constant reference torque, multiplying an assistant part of the accelerator pedal Map profile by the difference between the real-time maximum torque ability of the hybrid power-train and the constant reference torque, and adding the two multiplied results to obtain the initial torque requirement.

The torque requirement filtering in the driver's torque requirement interpretation can be carried out by the following methods, but not limited to these methods: (1) choosing torque slope control to the change rate based on the state of the hybrid power-train and other parameters; (2) choosing a first-order filtration control to a time constant based on the state of the hybrid power-train and other parameters; and (3)

choosing a second-order filtration control to a time constant based on the state of the hybrid power-train and other parameters.

The torque distributing and coordinating between the multiple power sources means distributing the driver's torque requirement obtained by the interpretation to the power sources driving the vehicle in the current operation mode, fundamentally based on energy management strategy and efficiency optimization strategy of the hybrid power-train. The torque distributing and coordinating between the multiple power sources mainly includes several aspects as follows: 1. torque pre-distribution between the power sources; 2. filtration and change rate limitation; and 3. torque dynamical compensation. The torque pre-distribution between the power sources means determining preliminary torque requirements of the power sources, such as the engine and the motor, based on the energy management strategy, i.e. the desired power which is required for charging, discharging, or charging and discharging traction batteries; and based on the efficiency optimization strategy, i.e. the current engine load with which the optimal overall fuel efficiency is achieved. Filtering and change rate limiting means filtering and slope limiting the outputted torques, provided that the preliminary torque requirements for the power sources have been determined, and in consideration of torque response characteristic of the engine and of the motor. The torque dynamical compensation includes, in view of the fact that the engine has a slower torque response than the motor, measuring in real time the difference between the engine torque requirement and an actual engine output torque, and compensating the difference with the motor to ensure that the total torque output of the power sources conforms to the driver's torque requirement.

The disclosure also provides a hybrid vehicle, wherein the torque control method described as above is applied to a power-train of the hybrid vehicle. The same or even better drive ability can be achieved for the hybrid vehicle compared with conventional power vehicles.

The disclosure has beneficial effects which lie in that: (1) for a hybrid power-train having multiple operation modes, the drive ability control method can ensure a consistent driving feeling of the driver within a real-time power source torque ability, that is, whichever operation mode the hybrid power-train operates in, the same vehicle speed and the same accelerator pedal opening always leads to the same total torque requirement of the power-train, and (2) the method facilitates match calibration of the hybrid power-train, wherein the driver torque requirement interpretation is optimized firstly, total torque output loads of power sources and final results of the driver's torque requirement interpretation in all operation modes are ensured depending on different operation modes, and implementing and testing are facilitated.

BRIEF DESCRIPTION OF THE DRAWINGS

The disclosure will be better understood with reference to the drawings. It is easily understood for those skilled in the art that the drawing are given only for an illustration purpose and are not intended to limit the protecting scope of the disclosure.

FIGS. 1-7 are illustrative views of steps of a hybrid power-train torque control method that the disclosure relates to.

DETAILED DESCRIPTION OF PREFERRED EMBODIMENTS

Particular embodiments of the disclosure are now described in detail in connection with the drawings, in order for those skilled in the art to better understand the subject matter claimed by the disclosure.

The term "drive ability" cited in the disclosure includes two aspects: (1) match of a desired power output for a driver and an actual power output, wherein, as an example, in a condition of 10% depressed degree of an accelerator pedal and at a speed of 50 kph (kilometers per hour), an desired acceleration of the driver is generally 1 m/s$^2$, and therefore a required power torque (Nm) can be estimated based on a drag force of a vehicle of a target type at the speed of 50 kph, the whole vehicle mass etc. and be considered as a primary result of torque explanation; and (2) ride comfort and response speed with reference to the power output, wherein high frequency components contained in the power torque required by the driver are eliminated and medium and low frequency components are selected after filtration to balance the response speed and the ride comfort.

An example of an embodiment of a drive ability control method for a hybrid power electrical vehicle is described in the following. This embodiment is directed to a full hybrid power-train with two motors (an integrated starter and generator ISG and a driving motor TM, wherein, hereinafter, a first motor refers to the integrated starter and generator ISG and a second motor refers to the driving motor TM). The hybrid power-train has operation modes including: a pure electric drive mode, a serial mode, and a parallel mode.

The driver torque requirement interpretation includes calculation of maximum torque ability of the hybrid power-train, calculation of driver's desired power-train load rate, torque arbitration and limitation, and torque requirement filtration.

Figure 1:
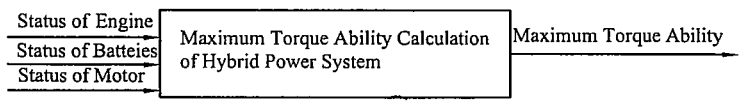

Referring to FIG. 1, the maximum torque ability of the hybrid power-train refers to the maximum torque achievable in the parallel mode in a current state of the power-train (the states of components of traction batteries, the motors, an engine etc.). In the parallel mode, the engine, the first motor and the second motor are all connected to a driving system, and the maximum torque of the power-train in the parallel mode is larger than in other modes, provided that the traction batteries have a normal dischargable power.

Figure 2:
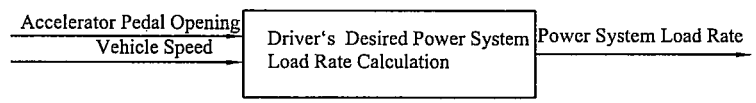
Figure 3:
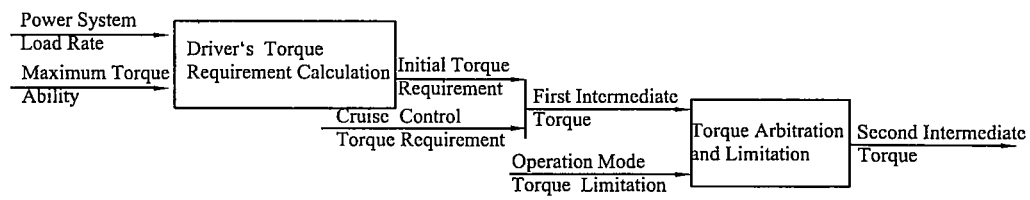

Referring to FIGS. 2-3, the driver's desired power-train load rate includes two parts: a basic part and an assistant part. Each of the basic part and the assistant part has an accelerator pedal Map profile. Only the basic part is included in the driver's desired power-train load rate and the assistant part has a load rate of 0 in cases of medium and low accelerator pedal openings. In cases that the accelerator pedal opening is above the medium accelerator pedal opening, the basic part Map profile rises up to a 100% load rate output first, and then the load rate of the assistant part increases as the accelerator pedal opening increase, up to 100%. Driver's basic torque requirement is derived by multiplying the load rate outputted in the basic part Map profile by a fixed curve of torque-speed characteristic. The fixed curve of torque-speed characteristic is established based on holding torque ability of the engine and of the motors and is obtained through smooth transition. Driver's assistant torque requirement is derived by multiplying the load rate outputted in the assistant part Map profile by the difference between the maximum torque ability of the hybrid system and the fixed torque characteristic. In this way, driver's initial torque requirement is then obtained as the sum of the driver's basic torque requirement and the driver's assistant torque requirement.

Figure 4:
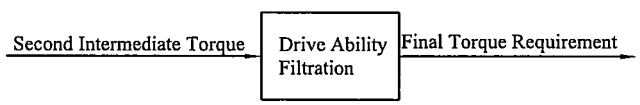

Referring to FIGS. 3-4, the driver's initial torque requirement is subjected to arbitration based on cruise control torque requirement, wherein the so called arbitration means choosing one from a plurality. A first intermediate torque is derived through the arbitration first, a second intermediate torque is derived then after the first intermediate torque being limited by the maximum torque of the driving system, and, finally, the second intermediate torque is subjected to the drive ability filtration to smoothly transition the torque requirement. Operation mode torque limitation means setting an "upper limit" for the torque requirement according to the current actual operation mode, and the torque ability is adjusted to be matched with a corresponding mode only when the current actual operation mode is switched to the corresponding mode. Typical conditions, for example, from the serial mode to the parallel mode, the torque ability in the serial mode is typically lower than in the parallel mode. When the driver's torque requirement in the serial mode increases and exceeds the maximum ability in the serial mode, limitation is carried out also based on the maximum torque in the serial mode, and at this time, switching from the serial mode to the parallel mode can be triggered and limitation is then carried out based on the maximum torque in the parallel mode after the switch. In this embodiment, the drive ability filtration is performed in a manner of torque change rate control, i.e., correcting the torque change rate based on the vehicle speed, the accelerator pedal opening, and the difference between the torques before and after filtration, in order to obtain a final torque requirement. The term filtration, as a relatively broad concept herein, can be interpreted as converting raw, non-uniform signals (in respect of the frequency domain, signals containing relatively more high frequency components) into uniform signals (in respect of the frequency domain, signals containing medium and low frequency components), and can be achieved by a variety of technical means, one of which is controlling the change rate of the second intermediate torque (others include: a first-order filtration, a second-order filtration etc.). The change rate is represented by Newton-meter per second (Nm/s) and refers to the level of the change rate of the torque in time domain. This ensures a driver's target torque to be achieved, the ride comfort is obtained, and there is no notable power lag for the driver.

Multi-power source torque distribution and coordination includes torque pre-distribution between the power sources, filtration and change rate limitation of the torques, and torque dynamical compensation.

Figure 5:
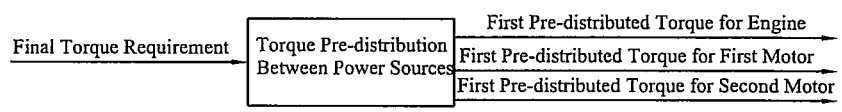
Figure 6:
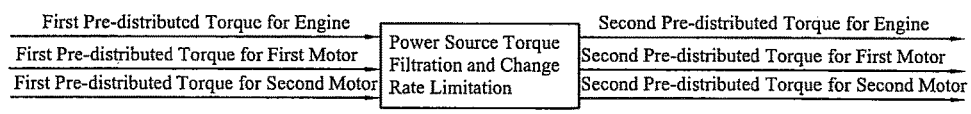
Figure 7:
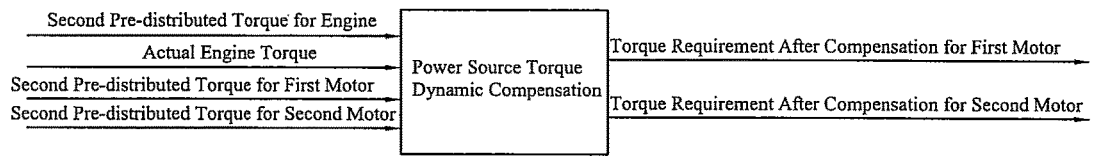

Referring to FIGS. 5-7, during the torque pre-distribution between the power sources, the torque requirement is pre-distributed preliminarily to the engine, the first motor, and the second motor depending on energy management strategy and efficiency optimization strategy, to obtain a first pre-distributed torque for the engine, a first pre-distributed torque for the first motor, and a first pre-distributed torque for the second motor. The requirement is subjected to filtration and change rate limitation and is converted into torque requirement for the engine, torque requirement for the first motor, and torque requirement for the second motor, which are a second pre-distributed torque for the engine, a second pre-distributed torque for the first motor, and a second pre-distributed torque for the second motor, respectively, in consideration of torque response characteristic of the engine and of the motors. During torque dynamical compensation, the difference between the engine torque requirement and an actual engine output torque is monitored in real time and is compensated with the first motor and/or the second motor, in order that the total torque output of the power sources is consistent with the driver's torque requirement.

By way of example, the torque pre-distribution between the power sources will be explained below. In a first step, in a condition that the driver's torque requirement is determined as 100 Nm with the speed of the power-train of 2000 rpm, it can be derived, through energy optimization algorithm (or an efficiency optimization Map profile obtained through offline optimization calculation), that the result of pre-distribution includes an engine output of 120 Nm and a total motor output of −20 Nm and the overall efficiency is optimal. Therefore, the pre-distribution plan is 100 Nm for the engine and −20 Nm for the motor. However, in an actual drive condition, it takes a long time for the engine torque to increase and the engine has a slower response than the motor, initiatively lowering the engine torque change rate facilitating emission and improving fuel economy. Therefore, in the above condition, the actual torque output of the engine may be 110 Nm. In order to ensure that the driver's torque requirement be met, further correction is needed to do to the motor torque so that an output of −10 Nm, instead of −20 Nm, is obtained. The exact desired distribution results, i.e. 120 Nm for the engine and −20 Nm for the motor, can only be obtained after a period of time when driving cycle characteristic becomes stable.

While some particular embodiments of the disclosure have been described and illustrated to show the principle of the disclosure, the disclosure can be implemented in other ways without departing from its principle.

The invention claimed is:

1. A hybrid power-train torque control method, power source components of the power-train including an engine and a motor, characterized in that the method comprises steps of:
   (1) interpreting driver's torque requirement, including:
      (1a) calculating a maximum torque achievable from the power-train;
      (2b) calculating a power-train load rate according to driver's instruction; and
      (1c) calculating the torque requirement based on the maximum torque and the power-train load rate, wherein the step (1c) includes calculating an initial torque requirement and choosing one torque between the initial torque requirement and other torques as a first intermediate torque, limiting the first intermediate torque according to an actual operation mode to obtain a second intermediate torque, and performing filtration control to the second intermediate torque to obtain a final torque requirement; and
   (2) torque distributing and coordinating between the power source components, including:
      (2a) distributing the torque requirement between the power source components, to obtain at least an engine pre-distributed torque for the engine and a motor pre-distributed torque for the motor; and
      (2b) acquiring an output torque of the engine in real time, calculating a difference between the output torque and the engine pre-distributed torque, and compensating the difference with the motor.

2. The hybrid power-train torque control method according to claim 1, characterized in that: parameters information on the power source components of the power-train and parameters information on an energy storage of the power-train are acquired prior to calculating the maximum torque.

3. The hybrid power-train torque control method according to claim 2, characterized in that: the energy storage comprises a traction battery.

4. The hybrid power-train torque control method according to claim 1, characterized in that: the maximum torque is calculated in all operation modes.

5. The hybrid power-train torque control method according to claim 4, characterized in that: the operation modes include a serial mode, a parallel mode, a series parallel mode, a pure electric drive mode, and any combination thereof.

6. The hybrid power-train torque control method according to claim 1, characterized in that: the power-train load rate is obtained by measuring accelerator pedal opening, acquiring signals pertaining to whole vehicle speed signals, and acquiring data from a table.

7. The hybrid power-train torque control method according to claim 1, characterized in that: after the step (2a) and prior to the step (2b), filtration control to the engine pre-distributed torque and the motor pre-distributed torque are also needed to perform.

8. The hybrid power-train torque control method according to claim 1, characterized in that: the initial torque requirement is derived by multiplying the maximum torque by the power-train load rate.

9. The hybrid power-train torque control method according to claim 1, characterized in that: the initial torque requirement is derived by multiplying the output torque in an optimal state by the power-train load rate.

10. The hybrid power-train torque control method according to claim 1, characterized in that: the initial torque requirement is derived by adding (1) a result of multiplying a basic part of the power-train load rate obtained from a look-up table by a reference torque and (2) a result of multiplying an assistant part of the power-train load rate obtained from a look-up table by a difference between the maximum torque and the reference torque.

11. The hybrid power-train torque control method according to claim 1, characterized in that the other torques include a cruise torque.

12. The hybrid power-train torque control method according to claim 1, characterized in that: filtration control to the second intermediate torque includes controlling a torque change rate or a first-order filtration control or a second-order filtration control.

13. A hybrid vehicle, characterized in that: a torque control method according to claim 1 is applied to a power-train of the hybrid vehicle.

* * * * *